US009801234B2

(12) United States Patent
Caine et al.

(10) Patent No.: US 9,801,234 B2
(45) Date of Patent: Oct. 24, 2017

(54) POWER EFFICIENT MESH NETWORK (71) Applicant: Logitech Europe S.A, Lausanne (CH)

(72) Inventors: Xavier Caine, San Jose, CA (US); Kevin Mclintock, San Mateo, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 76 days.

(21) Appl. No.: 14/835,329

(22) Filed: Aug. 25, 2015

(65) Prior Publication Data

US 2017/0064599 A1 Mar. 2, 2017

(51) Int. Cl.
*H04W 4/00* (2009.01)
*H04W 84/20* (2009.01)
*H04W 52/02* (2009.01)
*H04W 84/18* (2009.01)
*H04W 84/22* (2009.01)

(52) U.S. Cl.
CPC ....... *H04W 84/20* (2013.01); *H04W 52/0209* (2013.01); *H04W 52/0277* (2013.01); *H04W 84/18* (2013.01); *H04W 84/22* (2013.01); *Y02B 60/50* (2013.01)

(58) Field of Classification Search
CPC . H04W 52/0261; H04W 52/06; H04W 84/18; H04W 84/22; Y02B 60/50
USPC ........................................................ 370/331
See application file for complete search history.

(56) References Cited

U.S. PATENT DOCUMENTS

| 8,396,007 B2* | 3/2013 | Gonia | H04W 24/02 342/173 |
| 9,125,138 B2 | 9/2015 | Abuan et al. | |
| 9,125,146 B1 | 9/2015 | Edara et al. | |
| 2008/0192666 A1* | 8/2008 | Koskan | H04W 52/0261 370/311 |
| 2010/0308765 A1 | 12/2010 | Moore et al. | |
| 2011/0158441 A1* | 6/2011 | Batra | H04R 1/1091 381/311 |

(Continued)

OTHER PUBLICATIONS

US 9,125,233, 09/2015, Morrill et al. (withdrawn)

(Continued)

*Primary Examiner* — Faisal Choudhury
(74) *Attorney, Agent, or Firm* — Patterson & Sheridan, LLP (57) ABSTRACT

A method of communication between a plurality of network devices and an external electronic device is provided. The method includes receiving, at a first network device, device information and power information from a second network device, where the received device information and power information is transferred over a first communication link on a first network, where the first communication link is formed between a first transceiver of the first network device and a first transceiver of the second network device. The method further includes comparing the received power information with power information of the first network device. The method further includes transferring a portion of the received device information from the first network device over a second communication link on a second network when it is determined based on the comparison that the first network device is better suited than the second network device to communicate on the second network.

16 Claims, 4 Drawing Sheets

(56) References Cited

U.S. PATENT DOCUMENTS

2015/0289295 A1* 10/2015 Granbery ............ H04W 76/023
                                                  370/230
2016/0198410 A1*  7/2016 Cherniavsky ..... H04W 52/0229
                                                  370/278
2016/0205716 A1*  7/2016 Wu ....................... H04W 24/04
                                                  455/450

OTHER PUBLICATIONS

Office Action dated Dec. 2, 2015 for Application No. 14835352.
Home—bttn. (n.d.). Retrieved Sep. 1, 2015. <https://bt.tn/>.
Amazon.com: Dash Button. (n.d.). Retrieved Sep. 1, 2015. <http://www.amazon.com/b/?node=10667898011&lo=digital-text>.
Hue—Personal Wireless Lighting. (n.d.). Retrieved Sep. 1, 2015. <http://www2.meethue.com/en-us/the-range/hue-tap/>.
Philips solves Hue's biggest problem with new dimmer switch. (Aug. 25, 2015). Retrieved Sep. 1, 2015. <http://www.theverge.com/2015/8/25/9204523/philips-solves-hue-s-biggest-problem-with-new-dimmer-switch>.

\* cited by examiner

POWER EFFICIENT MESH NETWORK

BACKGROUND

Field

Embodiments of the present disclosure generally relate to wireless electronic devices and methods of using the same that are powered by an on-board power source (e.g., a battery), and more specifically to a method and apparatus for extending the amount of useable time that a group of the wireless electronic devices (also referred to as a mesh) can communicate with each other and other external devices.

Description of the Related Art

Many of today's electronic devices operate on battery power. These electronic devices consume battery power to perform a variety of operations, such as running applications, energizing LEDs and displays, and performing wireless communication. For some electronic devices, the power required to remain connected to one or more wireless networks can represent the largest component of power consumed by these devices. Thus, the power demands for wireless communication can significantly affect when recharging or replacing a battery is needed for a given electronic device.

In some wireless communication applications it is desirable to assure that information is rapidly transferred between electronic devices, such as during user emergency situations or where the rapid transfer of information between electronic devices is required to assure that the information is received in a timely manner by the receiving electronic device so that it can perform some useful function. Therefore, in some configurations it is desirable to continually maintain a wireless connection between electronic devices to avoid the time lag that is required to form a wireless connection every time that information needs to be transferred between electronic devices. Maintaining a continuous wireless connection to a wireless network can improve the reliability and speed that the transmission of information is performed across the wireless network, but at a cost of high-power consumption of limited power resources when an electronic device is battery powered.

Recharging a battery for a device typically limits the usefulness of the electronic device, for example, by restricting a portable electronic device to the length of the chord to which the device is attached during recharging. If the function of the electronic device is connected to a particular location, such as a sensor attached to a door, then the main function of the device can be lost during recharging that occurs at locations other than that particular location. Replacing a battery for an electronic device can be performed faster than recharging a battery for the device, but the device loses all function when the device is powered down during the replacement.

Due to the reduced or lost functions of electronic devices that occur during recharging and replacing batteries and the high-power consumption that is caused by maintaining continuous wireless connections, there is a need to increase the time that these electronic devices can remain fully operational before recharging or replacing a battery is needed.

SUMMARY

Embodiments disclosed herein generally relate to wireless communication. In one embodiment, a method of communication between a plurality of network devices is provided. The method may include receiving, at a first network device, device information and power information from a second network device, wherein the received device information and power information is transferred over a first communication link on a first network, wherein the first communication link is formed between a first transceiver of the first network device and a first transceiver of the second network device. The method further includes comparing the received power information with power information of the first network device, wherein the power information of the first network device includes information about a first power source used to power the first network device and the received power information includes information about a second power source used to power the second network device. The method further includes transferring at least a portion of the received device information from the first network device over a second communication link on a second network when it is determined based on the comparison that the first network device is better suited than the second network device to communicate on the second network, wherein the second communication link is formed between a second transceiver of the first network device and a device transceiver of an external electronic device.

In another embodiment, a method is provided for communicating between a plurality of network devices on a low-power wireless network and an external electronic device on a high-power wireless network. The method includes receiving, by a first network device of a plurality of network devices, information from one of the other plurality of network devices using a first communication link formed using the low-power wireless network. The method further includes transferring at least a portion of the received information from the first network device to the high-power wireless network using a second communication link, wherein the first and second communication links are maintained simultaneously by the first network device. The method further includes upon determining a second network device of the plurality of network devices is better suited to communicate with the high-power wireless network than the first network device, forming a third communication link between the second network device and the high-power wireless network and terminating the second communication link.

In another embodiment, a first network device is provided including a processor, a first transceiver, and a second transceiver, a memory hosting an application, which, when executed on the processor, performs an operation for communicating to a plurality of other network devices on a first wireless network and communicating to an external electronic device on a second wireless network. The operation includes receiving, at the first network device, device information and power information from a second network device, wherein the received device information and power information is transferred over a first communication link on a first network, wherein the first communication link is formed between a first transceiver of the first network device and a first transceiver of the second network device. The operations further include comparing the received power information with power information of the first network device, wherein the power information of the first network device includes information about a first power source used to power the first network device and the received power information includes information about a second power source used to power the second network device. The operations further include transferring at least a portion of the received device information from the first network device over a second communication link on a second network when it is determined based on the comparison that the first network device is better suited than the second network device to communicate on the second network, wherein the second communication link is formed between a second transceiver of the first network device and a device transceiver of the external electronic device.

Embodiments of the disclosure may also provide a wireless communication system that includes a first network device and a second network device. The first network device may include a first processor, a first power storage device, an external network communication transceiver, and an internal network communication transceiver. The second network device may include a second network device comprising a second processor, a second power storage device, an external network communication transceiver, and an internal network communication transceiver. The first network device may further include a non-transitory memory in the first network device that hosts an application, which, when executed by the first processor, performs an operation comprising receiving device information and power information from the second network device, wherein the received device information and power information is transferred over a first communication link formed between the internal network communication transceiver of the first network device and the internal network communication transceiver of the second network device, comparing the received power information with power information of the first network device, wherein the power information of the first network device includes information about the first power storage device used to power the first network device and the received power information includes information about the second power storage device used to power the second network device, and transferring at least a portion of the received device information from the first network device to an external electronic device using the external network communication transceiver in the first network device when it is determined based on the comparison that the first network device is better suited to communicate with the external electronic device than the second network device.

Embodiments of the disclosure may also provide a wireless communication system, comprising a first network device and a second network device. The first network device may include a first processor, a first power storage device, an external network communication transceiver, an internal network communication transceiver, and a first power sensor that is configured to measure power information from the first power storage device. The second network device may include a second network device comprising a second processor, a second power storage device, an external network communication transceiver, an internal network communication transceiver, and a second power sensor that is configured to measure power information from the second power storage device. The first network device may further include a non-transitory memory in the first network device that hosts an application, which, when executed by the first processor, performs an operation comprising comparing power information that is received from the second network device with power information measured by the first power sensor, wherein the received power information includes information measured by the second power sensor, and transferring device information from the first network device to an external electronic device using the external network communication transceiver when it is determined, based on the comparison of the power information received from the second network device and the power information measured by the first power sensor, that the first network device is better suited to communicate with the external electronic device than the second network device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to techniques for extending an amount of time that an electronic device, which is powered by an on-board power source (e.g., a battery) can wirelessly communicate with an external device using a wireless communication technique that consumes a large amount of power versus other wireless communication techniques. Wireless communication techniques that consume a large amount of power may be required in some applications to assure that information is rapidly and reliably transferred between the electronic device and an external device and/or the internet.

However, by use of one or more of the methods and apparatuses described herein the amount of time that an electronic device can wirelessly communicate with an external device can be increased by forming a group of networked electronic devices that wirelessly communicate with each other using a wireless technique that consumes less power than the wireless technique used to communicate with the external device on the high-power wireless network. The methods and apparatuses described herein allow the group of networked electronic devices to continuously communicate with the external device by selecting one of the networked electronic devices to continuously communicate with the external device using the higher power-consuming wireless technique. Therefore, one or more of the embodiments disclosed herein can extend the amount of time that the group can continuously communicate with an external device and/or internet by selectively switching which device is wirelessly connected to a high-power wireless network to enable the better-suited device (e.g., devices with higher power levels) to provide the wireless connection to the high-power wireless network for the group. Furthermore, during some periods of time (e.g., low battery levels on all of the devices in the group), the group can disconnect from the high-power wireless network when data is not being transferred between the networked electronic devices or between the group and the external device. The group can then later reconnect to transfer data between the networked electronic devices and the external device on an as-needed basis or until conditions improve (e.g., when a network device in the group has a more fully charged battery).

The embodiments described herein provide numerous examples of how the collective runtime of the group of network devices can be extended before a disruption in the communication between the network devices and/or communication between the networked devices and external device is necessitated by recharging or replacing a battery in one of the network devices occurs. For example, the state-of-charge and/or predicted runtimes of the batteries in each of the network devices in the group can be monitored. Monitoring these values enables the use of the network devices having higher amounts of charge or longer predicted runtimes as the bridge device while conserving power for those devices having lower amounts of charge or shorter predicted runtimes, so that the collective runtime of the group of devices can be extended.

Furthermore, in some embodiments, execution of software applications stored in the memory of the network devices also allow the group of network devices to disconnect from the high-power wireless network in an effort to conserve power when battery power levels for the network devices in the group are below a certain power level threshold. The network device providing the connection between the group of network devices and the external device accessible on the high-power wireless network, also referred to as the bridge device, can then reconnect to the high power wireless network on an as-needed basis minimizing power consumption until a bridge device with more power becomes available.

Moreover, if an additional network device (e.g., a mobile phone) becomes available on the low-power wireless network and the high-power wireless network and to the group, then the additional network device can serve as the bridge device allowing the collective power of the group to be conserved. Using the additional network device as the bridge device allows power consumption for the group to be conserved because no network device in the group is communicating with its high-powered transceiver on the high-power wireless network.

Figure 1A:
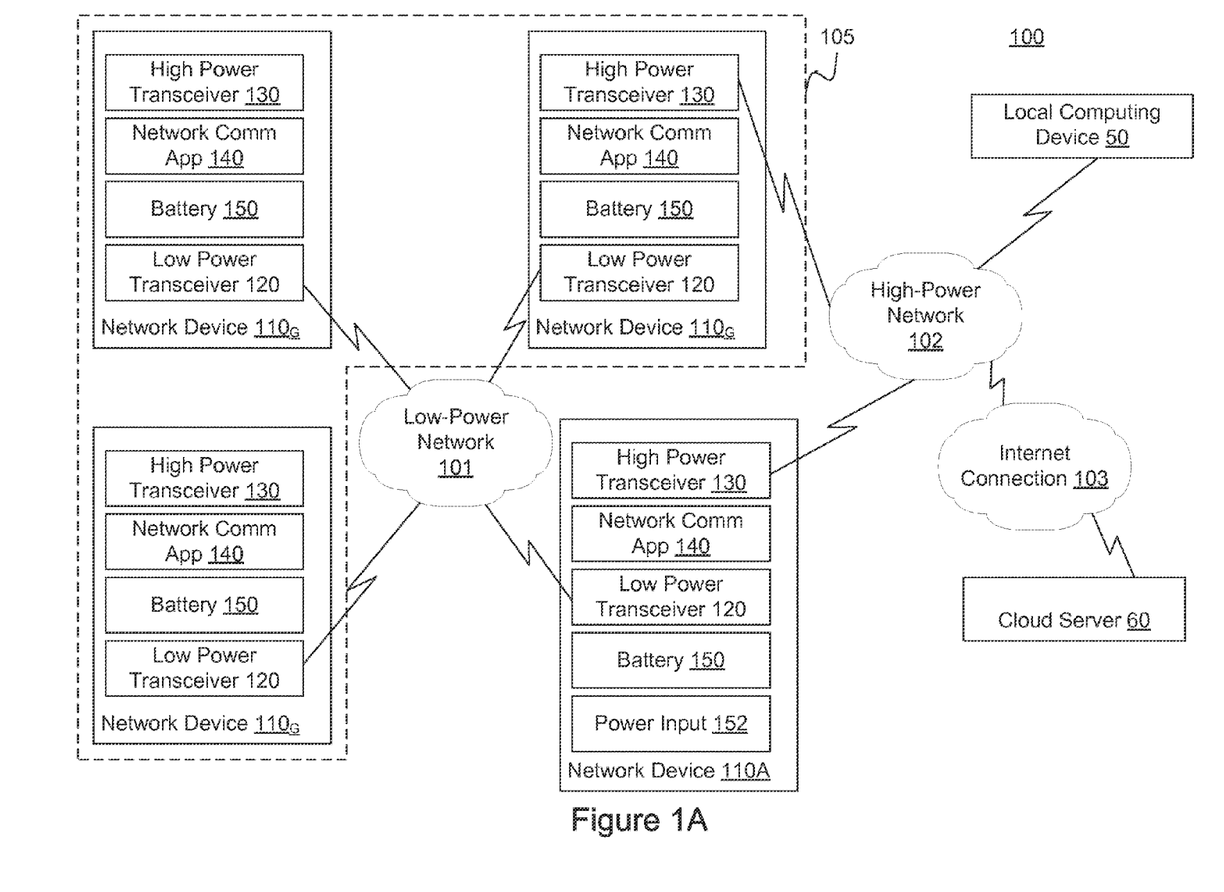
FIG. 1A is a conceptual diagram illustrating a communication environment for a group of network devices, according to one embodiment.

FIG. 1A is a conceptual diagram illustrating a communication environment 100 in which a group 105 of network devices 110$_G$ (the "G" indicating the network device is part of the group 105) are positioned, according to one embodiment. Each network device 110$_G$ is capable of wireless communication on a low-power wireless network 101 and a high-power wireless network 102. Although the network devices 110$_G$ are similarly illustrated in FIG. 1A, one or more of the network devices 110 may be different from the other network devices 110$_G$. For example, in one embodiment the group 105 of network devices 110$_G$ may include a sensor, an audio device, a universal remote, a controller, a smart phone, a PDA, a computer and an actuator. One will note that the phrases "high-power wireless network" and "low-power wireless network" used herein are intended to describe types of communication methods and/or communication protocols that use different relative levels of power to complete the transfer of information between various electronic devices. In other words, a first device using the "high-power wireless network" to communicate with a second device will use more power to perform the communication process versus the same first device transferring the same information to the second device using the "low-power wireless network." The transfer of information on the "high" and "low" power networks will generally require different hardware and software components to perform the transfer of data between devices.

The network devices 110$_G$ are able to communicate with each other over a low-power wireless network 101. Each network device 110$_G$ includes an internal network communication transceiver, which is also referred to herein as a low-power transceiver 120, to enable connectivity to the other network devices 110$_G$ on the low-power wireless network 101. The low-power wireless network 101 could be, for example, a Bluetooth® network (e.g., BTLE, Bluetooth classic), Avnera Audio Link (AAL) protocol network, ANT network, ANT+ network, a 433 mHz network, ZigBee or Zigbee RF4CE network, Nike+ network, IrDA network, Zwave network, or a Wi-Fi network (e.g., IEEE 802.11 a,b,g,n).

The group 105 of network devices 110$_G$ is also connected to a high-power wireless network 102. Each network device 110$_G$ includes a high-power transceiver 130 to enable connectivity to high-power wireless network 102. The high-power wireless network 102 can be, for example, a Wi-Fi network (e.g., IEEE 802.11 a,b,g,n) or a cellular network, such as a GSM, CDMA, GPRS, and fourth generation (4G) telecommunication network. The high-power wireless network 102 may be connected to one or more other local or remote devices, also referred to herein as external electronic devices, such as a local computing device 50 or a cloud server 60 that is accessible through an internet connection 103. The high-power transceiver 130 is thus also referred to herein as an external network communication transceiver, which may be configured to communicate with the external electronic device. In some embodiments, the external electronic device may include intermediary devices that are intended to relay the signals received on the high-power wireless network 102, such as a wireless router, cell tower, or any other type of wireless access point device. In some communication configurations, a high-power transceiver 130 in one of the network devices 110$_G$ may also be used to transfer information to other network devices 110$_G$ using a communication link formed between the high-power transceivers 130 found in the linked network devices 110$_G$. In some cases, one of the linked network devices 110$_G$ is the bridge device.

As briefly discussed above, a given type of network can be classified as the low-power wireless network 101 or the high-power wireless network 102 depending on the power usage of the other network. For example, a Wi-Fi network can be the high-power wireless network 102 when the other network is a Bluetooth® network, or the Wi-Fi network can be the low-power wireless network 101 when the other network is a cellular network or other type of network that uses more power to transfer information between devices than using the Wi-Fi network.

In some configurations, the network devices 110$_G$ are able to continuously communicate with each other over the low-power wireless network 101, while the bridge device is also continuously communicating with the external device over the high-power wireless network 102. As discussed above, the collective runtime of the group of network devices 110$_G$ can thus be extended before a disruption in the communication between one or more of the networked devices $110_G$ and/or communication between the networked devices $110_G$ and external device is necessitated due to the need to recharge or replace one of the power sources in one of the network devices $110_G$ occurs. Therefore, the transfer of information speed between the networked devices $110_G$ (e.g., no time lag) can be maintained at a desirable level, while the collective useable lifetime of the networked devices $110_G$ can be maximized.

Each network device $110_G$ also includes a power source 150 to power the components of the network device $110_G$. For example, the power source 150 may power the low-power transceiver 120 and the high-power transceiver 130. The power source 150 (also referred to herein as a "power storage device") may be an on-board battery, super capacitor or other similar energy storage device that is rechargeable or non-rechargeable. The power source 150 may be sized to enable the network device $110_G$ to operate for years before recharging or replacement of the power source 150 is needed.

The group 105 of network devices $110_G$ can use different network topologies to form the connections between each other on the low-power wireless network 101 and the high-power wireless network 102. These network topologies can include, for example, peer-to-peer, cluster, star and combinations of these arrangements. In some embodiments, each network device $110_G$ includes the low-power transceiver 120 and the high-power transceiver 130, so each network device $110_G$ is capable of communicating to both networks 101, 102 directly. FIG. 1A shows all of the network devices $110_G$ connected to each other on the low-power wireless network 101 and one of the network devices $110_G$ connected to the high-power wireless network 102.

During some periods of time, the communication environment 100 may include an additional network device $110_A$ (the "A" indicating the network device is additional and not part of the group 105), such as a mobile phone, smart phone, personal computer, tablet, smart watch or other similar device. Used herein, a network device 110 without a subscript character refers to either a network device $110_G$ of the group 105 or at least one additional network device $110_A$. The additional network device $110_A$ can include many of the same components as the network devices $110_G$, such as the transceivers 120, 130 and the power source 150. In some embodiments, the additional network device $110_A$ also includes a power input 152. The power input 152 can be used to recharge the power source 150 of the additional network device $110_A$, by connecting the power source 150 to external power. In some embodiments, the additional network device $110_A$ is not powered by a battery, such as an electronic device that receives power from an electrical outlet. Thus, the additional network device 110A may be powered by an on-board power source, a remote power source, or a combination of an on-board power source and a remote power source.

The additional network device $110_A$ is generally not part of the group 105, but the additional network device $110_A$ can help to extend the collective runtime of the group 105 before a disruption necessitated by recharging or replacing a battery for one of the network devices $110_G$ in the group 105 occurs. For example, the additional network device $110_A$ can connect to the group 105 on the low-power wireless network 101 and can also connect to the high-power wireless network 102. The additional network device $110_A$ can serve as a bridge device between the low-power wireless network 101 and the high-power wireless network 102 allowing the group 105 to collectively conserve power by not requiring any of the network devices $110_G$ to be directly connected to the high-power wireless network 102. The additional network device $110_A$ may be available to communicate with the network devices $110_G$ on a transient basis. The transient basis of the additional network device $110_A$ may be caused, for example, by moving the additional network device $110_A$ to a location beyond the communication range of one of the networks 101, 102 (e.g., someone leaving a location with a mobile phone) or shutting off the additional network device $110_A$ (e.g., a desktop computer powering down).

As noted above, the network devices 110 consume more power when exchanging a given set of data over the high-power wireless network 102 versus exchanging a given set of data over the low-power wireless network 101. For example, a first network device $110_1$ (a network device $110_G$ or an additional network device $110_A$) consumes more power transmitting data using the high-power transceiver 130 than when the first network device $110_1$ transmits the same data using the low-power transceiver 120. Thus, to conserve power the network devices 110 generally communicate with each other over the low-power wireless network 101 (first network) and thus provide information to the high-power wireless network 102 and external device(s) through one of the network devices 110, such as the first network device $110_1$.

A communication link between the low-power transceivers 120 of two network devices 110 is referred to as a low-power communication link (e.g., first communication link). A communication link between a high-power transceiver 130 of one of the network devices 110 and a transceiver of the device (e.g., local computing device 50) on the high-power wireless network 102 (second network) is referred to as a high-power communication link (e.g., second communication link). A high-power communication link formed after terminating the second communication link is referred to as a third communication link. For example, information can first be exchanged between the low-power wireless network 101 and the high-power wireless network 102 when the first network device $110_1$ is the bridge device, and then information can be exchanged between the low-power wireless network 101 and the high-power wireless network 102 when a second network device $110_2$ is the bridge device. In this example, when the first network device $110_1$ is the bridge device, the first network device $110_1$ is communicating with the high-power wireless network 102 via the second communication link, and when the second network device $110_2$ becomes the bridge device, the second network device $110_2$ is communicating with the high-power wireless network 102 via the third communication link. Unless otherwise specified, any network devices 110 can be the bridge device and a communication link can be formed between any network device 110 and the high-power wireless network 102. In some embodiments, the bridge device can maintain a persistent connection to the high-power wireless network 102 for long periods of time, such as several days, several months, or longer. However, in some embodiments, the bridge device can deliberately disconnect from the high-power wireless network 102 to conserve power under some conditions as is described below in reference to FIG. 3.

Each network device 110 that is connected to both networks 101, 102 is referred to as a bridge device. Because each network device 110 can connect to both networks 101, 102, any of the network devices 110 can be a bridge device. FIG. 1A shows two bridge devices, but a common arrangement includes one bridge device, so that only one network device $110_G$ is connected to the high-power wireless network 102 in the absence of an additional network device $110_A$, and, in some configurations, no network device $110_G$ is connected to the high-power wireless network 102 when an additional network device $110_A$ is serving as the bridge device. Having no network device $110_G$ or only one network device $110_G$ connected to the high-power wireless network 102 reduces the power consumed by the group 105 relative to arrangements having more than one network device $110_G$ connected to the high-power wireless network 102. Having one network device 110 continually connected to the high-power wireless network 102 maintains a low latency type communication link (e.g., high data delivery speed) between the network devices 110G and an external device, such as the local computing device 50, on the high-power wireless network 102. For example, in one embodiment, one of the network devices 110 can maintain a low latency type communication link for a delay period that can be, for example, multiple hours, multiple days, multiple months or longer. The delay period can be a period of time during which there is no communication transferred from the network devices 110 to the high-power wireless network. In general, a low latency communication is created when the communication process requires no overhead time, or at least an insignificant amount of overhead time, to transfer data across a communication link. Overhead time includes the time that is required to place a communication link in a state where data can then be transferred across the commination link between devices. Thus, the overhead time may include the time used to initiate the communication process (e.g., pairing process), and thus may include the steps of creating and storing a "link key" and authenticating the identity of the linked device(s). Many conventional wireless protocols require either encryption or authentication, and as such require pairing before they let devices connect to each other and transfer data. The addition of these overhead time related steps can be time consuming and lead to an undesirable latency for the transfer of information between devices.

Each network device 110 also includes a network communication application 141 that can assist each network device $110_G$ in the group 105 exchange data between the low-power wireless network 101 and an external device, such as local computing device 50, that is connected to the high-power wireless network 102. The network communication application 141 is generally configured to help extend the collective runtime of the group 105 before a disruption occurs, such as powering down of one of the network devices $110_G$ to change a battery. As discussed further below in reference to FIG. 2, the network communication application 141 can be executed to determine when a given network device 110 serves as a bridge device. Also, as discussed further below in reference to FIG. 3, the network communication application 141 can be executed to determine how a given network device 110 should interact with the low-power wireless network 101 and the high-power wireless network 102 when the network device 110 is a bridge device.

Figure 1B:
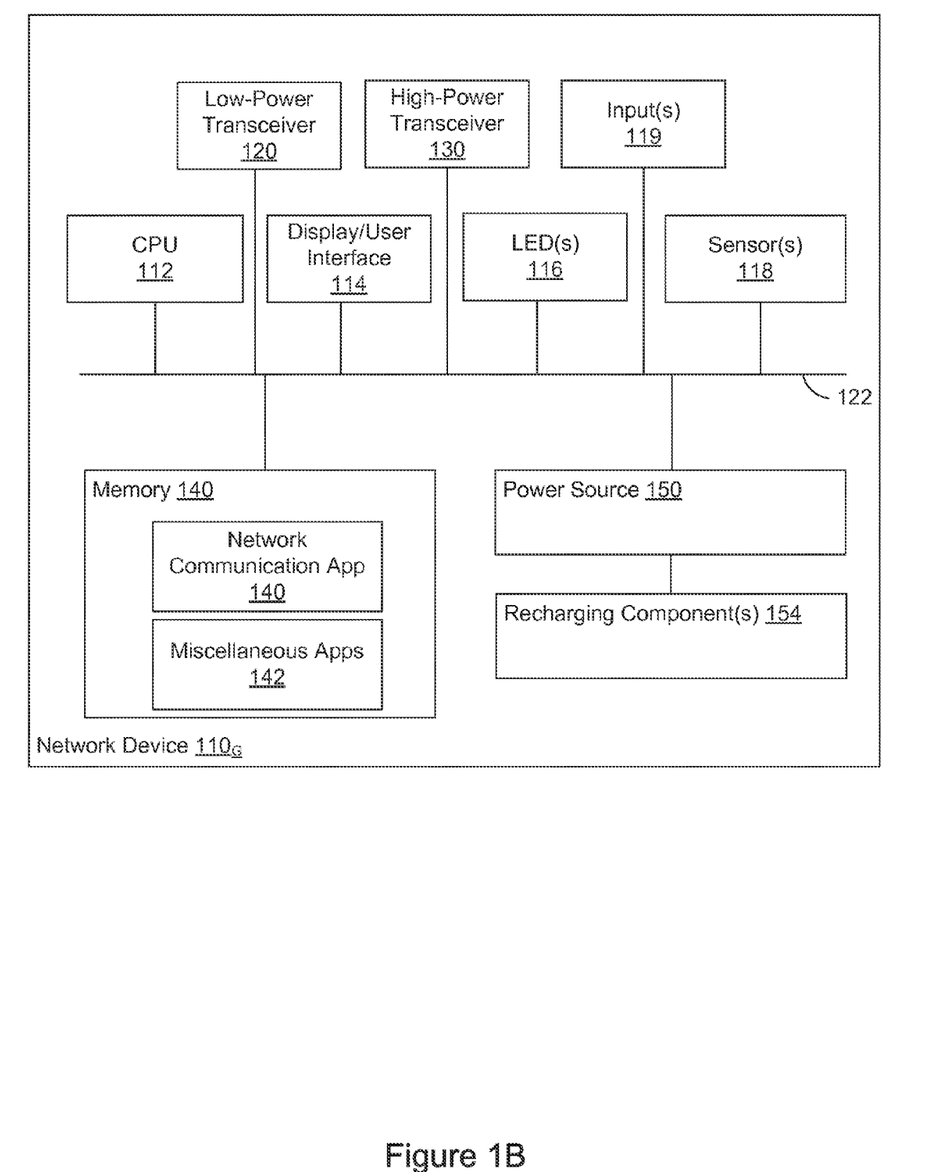
FIG. 1B illustrates a network device that can be used in the group of network devices of FIG. 1A, according to one embodiment.

FIG. 1B illustrates an exemplary network device $110_G$ from the group 105 that may be used to execute the methods 200, 300 described above, according to one embodiment. As shown, the network device $110_G$ includes the low-power transceiver 120, the high-power transceiver 130, and the power source 150 described above in reference to FIG. 1A. The network device $110_G$ can further include, without limitation a central processing unit (CPU) 112, a display/user interface 114, one or more LEDs 116, one or more sensors 118 (e.g., a temperature sensor, voltage, amperage), one or more inputs 119 (e.g., a button), a memory 140, a recharging component(s) 154, and an interconnect 122 for providing power and communication between the components of the network device $110_G$. Of course, an actual network device such as a wireless sensor, will include a variety of additional hardware components. Furthermore, an actual network device may not include all of the components shown in FIG. 1B, such as the display/user interface 114 or the one or more LEDs 116.

The low-power transceiver 120 can be used to communicate on the low-power wireless networks 101 described above. For example, the low-power transceiver 120 can be a Bluetooth® transceiver for communicating on a Bluetooth® network. The high-power transceiver 130 can be used to communicate on the high-power wireless networks 102 described above. For example, the high-power transceiver 130 can be a Wi-Fi transceiver for communicating on a Wi-Fi network. The network device $110_G$ may use both transceivers 120, 130 when the network device $110_G$ is serving as the bridge device. When the network device $110_G$ is not serving as the bridge device, the network device $110_G$ generally only uses the low-power transceiver 120 in order to conserve power.

The memory 140 may be any technically feasible type of hardware unit configured to store data, such as a non-transitory memory. For example, memory 140 could be a hard disk, a random access memory (RAM) module, a flash memory unit, or a combination of different hardware units configured to store data. Network communication application 141, which is stored within the memory 140, includes program code that may be executed by CPU 112 (or also referred to herein as the processor) in order to perform various functionalities associated with the network device $110_G$.

The memory 140 may include the network communication application 141, which is further described below in reference to FIGS. 2 and 3. The CPU 112 is generally configured to retrieve and execute applications, such as the network communication application 141. The CPU 112 may store and retrieve data disposed in the memory 140. For example, the CPU 112 store and retrieve status information that can be used to determine when the network device $110_G$ should be the bridge device (FIG. 2) and how the network device $110_G$ should interact with the networks 101, 102 when the network device $110_G$ is the bridge device (FIG. 3). The CPU 112 can include a clock that may be used for any timers that may be used by the network communication application 141 or other applications.

The memory 140 may also include one or more miscellaneous applications 142, such as applications for interacting with the other components on the network device $110_G$, such as the display/user interface 114 and the one or more sensors 118. The miscellaneous applications 142 may include an application to check for alarm conditions that could include comparing measurements made by the sensor (e.g., temperature, leak detection, presence of smoke, liquid level, etc.) to alarm thresholds stored in the memory 140. In some embodiments, when an alarm condition exists, the CPU 112 may interact with an output, such as energizing and LED 116 or audio speaker (not shown). In some embodiments, the network device $110_G$ can transmit data indicating the alarm condition over the low-power wireless network 101 to another device, such as a Bluetooth® enabled speaker connected to external power or to a user's mobile phone for alerting a user.

The miscellaneous applications 142 of a given network device $110_G$ may also include applications to accept user input from input(s) 119 for interacting that network device $110_G$ (e.g., changing settings of the device) or for interacting with other devices on the networks 101, 102. As one example, the network device $110_G$ may include a switch to designate the device as an inaccessible device, so that the device is not used as the bridge device or not used as the bridge device until all other options for the bridge device have been exhausted. As another example the network device $110_G$ may include a button for transmitting a predetermined signal to an internet connected device, such as the cloud server 60 shown in FIG. 1A. In one embodiment, a button may be attached to a household device, such as a washer for cleaning laundry. When this button is pressed, execution of one of the miscellaneous applications 142 can cause the network device $110_G$ to transmit a signal across the networks 101, 102 (through a bridge device if necessary) to a cloud server 60 enabling a simple task, such as ordering additional laundry detergent to be performed. After pressing the button, the user may receive feedback from the cloud server 60 regarding completion of the order through numerous ways, such as an email from the cloud server 60 or illumination of an LED 116 on the network device $110_G$. In other embodiments, input from button may be used to perform a task on the low-power wireless network 101, such as causing the network device $110_G$ to transmit a signal to a Bluetooth® enabled speaker to sound an alarm, for example when a user suspects breach of security.

The power source 150 can provide power to all of the components of the network device $110_G$. In some embodiments, the power source 150 is a non-rechargeable battery. In other embodiments, the power source 150 may be a rechargeable battery, and the network device $110_G$ may include the recharging component(s) 154. In one embodiment, recharging components 154 may include solar cells and associated circuitry to recharge the power source 150. Other embodiments of the recharging component(s) 154 may include a power input for receiving an external power supply.

One or more of the sensors 118 may be a sensor to assist in determining a state-of-charge of the power source 150. The state-of-charge can then be used along with operating characteristics (e.g., average current and duty cycle) of the network device $110_G$ to estimate the predicted runtime of the network device $110_G$. The state-of-charge and the predicted runtime of the network device $110_G$ can then be included with the status information of the network device $110_G$, so that the network device $110_G$ can assist the other network devices 110 on the low-power wireless network 101 in making decisions, such as determining which network device 110 should be the bridge device. In some embodiments, one or more of the sensors 118 may be used to measure voltage of the power source 150, current from the power source 150, discharge voltage and/or current characteristics of the power source 150, and/or remaining amp-hours (or watt-hours) of the power source 150 to assist in determining the state-of-charge and/or predicted runtime. In this configuration, the one or more sensors 118 may be referred to as power source sensors.

Figure 2:
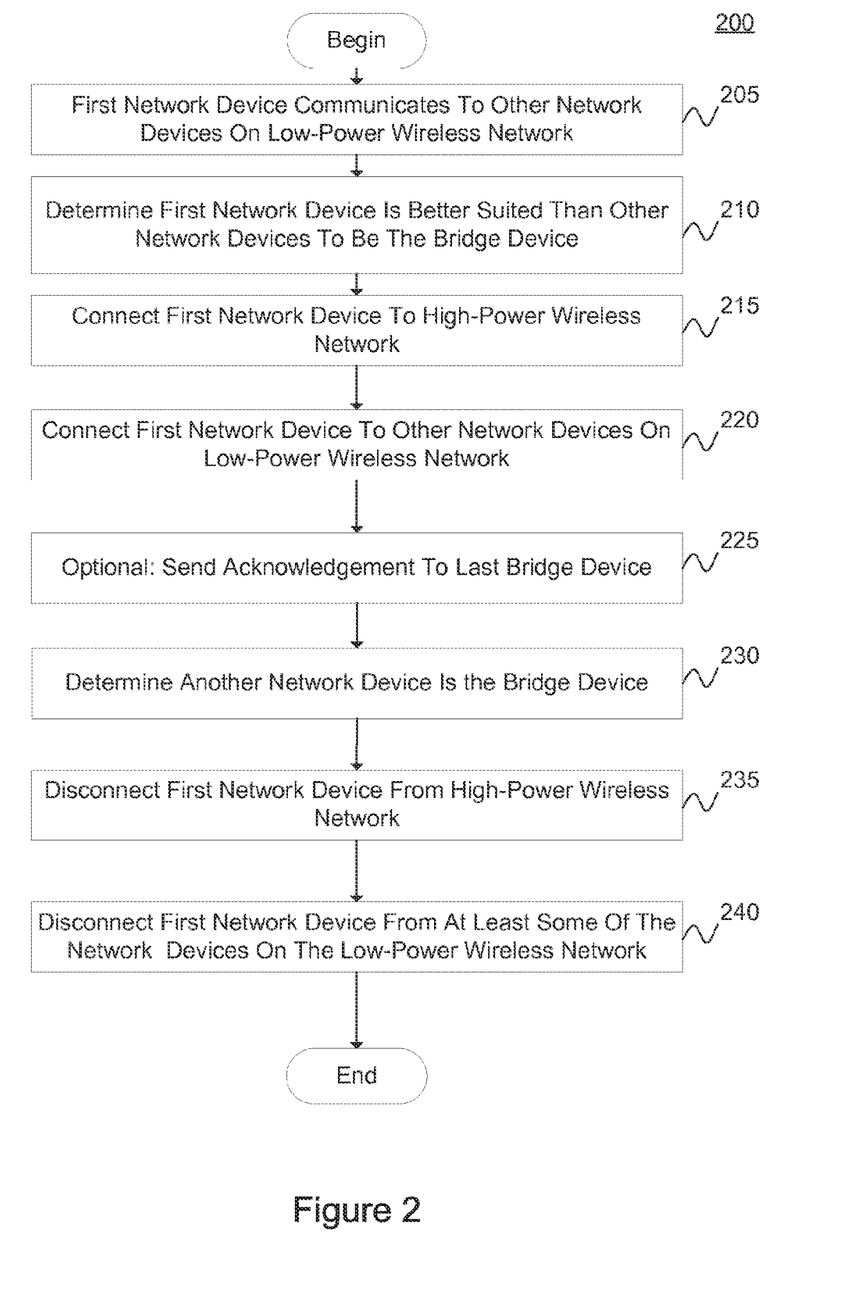
FIG. 2 is a flow diagram of a method for determining when a network device from the group of network devices of FIG. 1A connects and disconnects from a high-power wireless network, according to one embodiment.
Figure 3:
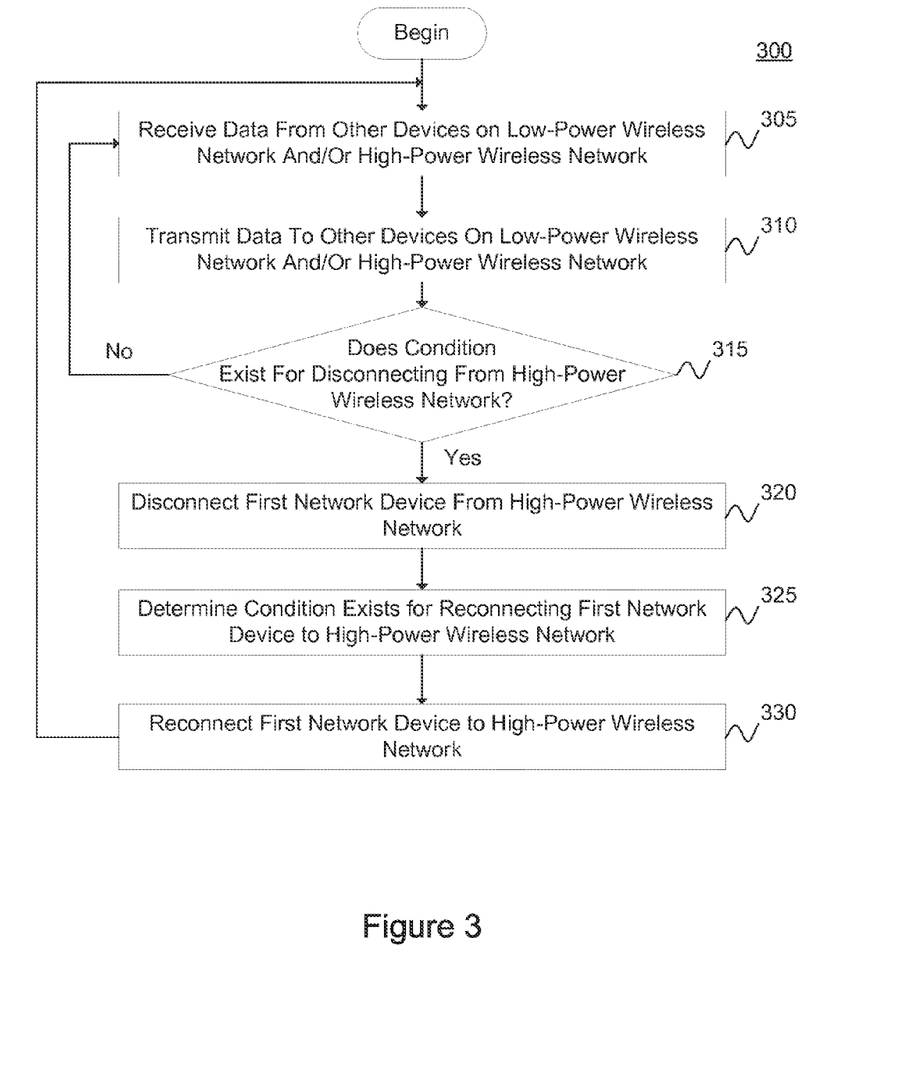
FIG. 3 is a flow diagram of a method for determining when a network device from the group of network devices of FIG. 1A transfers data between a low-power wireless network and a high-power wireless network, according to one embodiment.

FIG. 2 is a flow diagram of a method 200 for determining when a first network device $110_1$ (either a network device $110_G$ of the group 105 or an additional network device $110_A$ of FIG. 1A) connects and disconnects from the high-power wireless network 102, according to one embodiment. The method 200 may be performed by execution of the network communication application 141 stored within memory of each of the network devices 110. At step 205, the first network device $110_1$ communicates with at least some of the other network devices 110 on the low-power wireless network 101. At step 205, the first network device $110_1$ is not serving as the bridge device. If the first network device $110_1$ is a network device $110_G$ that is part of the group 105, then the first network device $110_1$ is likely not connected to the high-power wireless network 102 at step 205. By use of software (e.g., network communication application 141) stored with the network devices $110_G$ that are part of group 105, the network devices $110_G$ can be configured to only connect to the high-power wireless network 102 when it is determined that the network device $110_G$ is to serve as the bridge device. On the other hand, if the first network device $110_1$ is an additional network device $110_A$ that is not part of the group 105, then the first network device $110_1$ may be connected to the high-power wireless network 102 at step 205. For example, an additional network device $110_A$ that may already be connected to a high-power wireless network, such as a Wi-Fi network, is a mobile phone or a laptop computer.

Generally, when the first network device $110_1$ is not serving as the bridge device, the first network device $110_1$ communicates with the other network devices 110 on the low-power wireless network 101 through a network device 110 that is serving as the bridge device for the group 105. However, in some embodiments, the first network device $110_1$ can communicate with one or more of the network devices 110 that are not serving as the bridge in a peer-to-peer manner. For example, in some embodiments the first network device $110_1$ could be located too far from the bridge device to directly communicate with the bridge device in a peer-to-peer manner. In such cases, the first network device $110_1$ may communicate with the bridge device through another network device 110 that is communicating on the low-power wireless network 101. In other embodiments, the first network device $110_1$ may be the network device 110 that is providing the communication path between another network device 110 in the group 105 and the bridge device, so that the first network device $110_1$ can relay messages between the other network device 110 and the bridge device via the low-power wireless network 101.

At step 210, the first network device $110_1$, or another network device 110, determines that the first network device $110_1$ is better suited than other network devices 110 available on the low-power wireless network 101 to serve as the bridge device. The first network device $110_1$, or another network device 110, can check the status of numerous conditions to determine if the first network device $110_1$ is better suited to act as a bridge device between the two networks 101, 102. In some embodiments, the bridge device can periodically collect status information (e.g., power levels) from each of the network devices 110 connected to the bridge device. The bridge device can then distribute this status information along with status information of the bridge device to each of the network devices 110, so that each network device 110 can analyze the status information of the other network devices 110 relative to its own status information. In an effort to further reduce power consumption, in some of embodiments, one of the network devices 110 may process the status information of all of the network devices 110 to determine which network device 110 is better suited than the other network devices 110 to serve as the bridge device. The network device 110 that processes the status information in such an embodiment may be the bridge device or another network device 110.

In some embodiments, the determination of which network device 110 should serve as the bridge device can be made by a device accessible on the high-power wireless network 102 as another way to conserve power for the network devices $110_G$ in the group 105. For example, the local computing device 50 (e.g., a device controller, personal computer, etc.) or the internet-connected cloud server 60 shown in FIG. 1A may make the determination for which network device 110 should serve as the bridge device. In such embodiments, the network devices 110 may each still include code that can allow the network devices 110 to determine on their own which network device 110 should be the bridge device. This code can be activated, for example, if communication is lost between at least some of the network devices 110 and the bridge device or between at least some of the network devices 110 and the device connected to the high-power wireless network 102 (e.g., the cloud server 60). The following paragraphs describe some examples of status information that may be used to determine which network device 110 is better suited than the other network devices 110 to be the bridge device.

State-of-charge is one type of status information that may be monitored to assist in determining which network device 110 is better suited to serve as the bridge device. State-of-charge indicates how fully charged a battery is relative to the battery in a fully charged state, such as a state-of-charge of 50% indicates a battery that is half-charged. For some embodiments, all of the network devices $110_G$ in the group 105 may be powered exclusively by on-board power sources, such as non-rechargeable batteries. In such embodiments, it may be beneficial to have the network device $110_G$ having the highest state-of-charge serve as the bridge device in the absence of any additional network devices $110_A$. In other embodiments, a state-of-charge can be used as a factor for determining which network device 110 should serve as the bridge device.

Predicted runtime of the network devices 110 using an on-board power source is another type of status information that may be monitored to assist in determining which network device 110 is better suited to serve as the bridge device. The predicted runtime may be an estimate of how long a given network device 110 may operate under a typical load, such as an estimated load for when the given network device 110 serves as the bridge device. For example, a given network device 110 may have predicted runtime of 10,000 hours when the given network device 110 is powered by a 2000 mAh battery that is 50% charged, the estimated load is 10 mA and the estimated duty cycle is 1% to perform the continuous communication with the other devices. In some cases, using predicted runtime to determine which network device 110 should serve as the bridge device may yield better results than using state-of-charge to determine which network device 110. The predicted runtime information along with other parameters described herein (e.g., power usage, accessibility, maintenance status, etc.) can be used to decide which of the network devices should serve as the bridge device to extend the collective runtime that the group 105 of network devices $110_G$ that are communicating across the networks 101, 102. The predicted runtime information of a network device 110 may be generated by use of one or more sensors 118 and one or more software applications, stored in a memory location within the network device 110, that are executed by the processor (e.g., CPU 112). In some configurations, the predicted runtime of a second network device can be determined by a first network device based on power source information (e.g., measurements made of the second network device's power source) transmitted from the second network device and then processed by the one or more software applications executed by the first network device's processor.

The type of each network device 110 or features of a given network device 110 are other examples of status information that can be useful in determining which network device 110 is better suited to serve as the bridge device. For example, one of the network devices $110_G$ in the group 105 may include solar components to recharge an on-board battery. Because the network device $110_G$ having solar components can recharge its on-board battery, it can be beneficial to have this solar network device $110_G$ serve as the bridge device, especially when solar energy is available allowing the battery power of other network devices $110_G$ in the group 105 without on-board recharging capabilities to be conserved.

As another example, an additional network device $110_A$ may include the power input 152 described above for receiving external power from a remote power source, such as a mobile phone having an externally accessible power input that can be connected to a power supply to be powered from an electrical outlet. Because the additional network device $110_A$ including the power input 152 for receiving external power from a remote power source is likely easily recharged (e.g., mobile phone) or does not typically operate on battery power (e.g., a television), it can be beneficial to use such a network device $110_A$ as the bridge device because the network devices $110_G$ in the group 105 are powered by an on-board battery that is often non-rechargeable or difficult to recharge. Using the additional network device $110_A$ including the power input 152 for receiving external power from a remote power source as the bridge device allows collective runtime of the group 105 of network devices $110_G$ to be extended since none of the network devices $110_G$ in the group 105 consumes power using a high-power transceiver 130 when the additional network device $110_A$ is the bridge device.

Accessibility of the different network devices 110 is another feature that can be used to determine which network device 110 is better suited to serve as a bridge device. For example, a proximity sensor mounted on a door may be more accessible than a smoke alarm sensor mounted on a ceiling. As another example, a portable motion detector may be more accessible than the proximity sensor mounted to the door. In some instances, the accessibility factor is used as a tiebreaker after considering other factors, such as predicted runtime, for determining which network device 110 should be the bridge device. In other instances, it may be desirable to configure at least some of the network devices $110_G$ in the group 105 to never be the bridge device due to the inaccessibility of the network device $110_G$. For example, a user may prefer earlier replacement of a battery on an accessible network device $110_G$ (e.g., a portable motion detector) to achieve prolonged runtime of the inaccessible network device $110_G$ (e.g., a smoke detector mounted on a 20 foot high ceiling) by not using the inaccessible network device $110_G$ as the bridge device. A user may, for example, easily configure the accessibility of one of the network devices 110 by changing the position of one or more hardware switches on the network device 110 or by sending a software signal to the network device 110 through a user interface on the network device 110 or from a remote device. Because accessibility of a given network device 110 is a feature that is not likely to change often, status information about accessibility of the given network device 110 may be transmitted less than status information that is more variable, such as state-of-charge. In some cases, data relating to the accessibility of a device may be generated by the user or the inaccessible device, and stored in memory of the inaccessible device or one of the other network devices $110_G$ in the group 105 for use when trying to decide which network device 110 should be the bridge device.

Accessibility is just one example of why a user can choose to prioritize the power consumption of certain network devices 110 relative to other network devices 110. A user may prioritize the power consumption of certain network devices 110 relative to other network devices 110 for other reasons as well. For example, a user may choose to prioritize the power consumption of a network device 110 that is scheduled for routine maintenance, so that the battery having less charge may be replaced when the maintenance is performed.

Proximity to a wireless access point (e.g., a wireless router) on the high-power wireless network 102 can be another example of status information that can be used to determine which network device 110 is better suited to serve as the bridge device. Network devices 110 at far distances may consume more power than network devices 110 at closer distances. Transmitting from further locations can cause the network device 110 to provide a stronger signal to successfully complete data transmission. Moreover, network devices 110 further from the wireless access point may also encounter more noise from other wireless signals than network devices 110 closer to the wireless access point. This noise can force these network devices 110 at further distances to retransmit signals causing additional power to be consumed when the noise prevents an original signal from being successfully received by the wireless access point. Because proximity of a given network device 110 is a feature that is not likely to change often, especially for inaccessible devices, status information about the proximity of a given network device 110 may be transmitted less often than status information that is more variable, such as state-of-charge.

Observed levels of wireless interference or wireless signal strength can be another example of status information that can be used to determine which network device 110 is better suited to serve as the bridge device. Network devices 110 experiencing high levels of interference or weak wireless signal strengths for communicating on the high-power wireless network 102 may consume more power than network devices 110 experiencing less interference and/or higher wireless signal strengths for communicating on the high-power wireless network 102. Furthermore, network devices 110 experiencing high levels of interference or weak wireless signal strengths may be more prone to becoming disconnected from the high-power wireless network 102 than other network devices 110. Thus, it can be beneficial to use network devices 110 experiencing low levels of interference and/or high wireless signal strengths on the high-power wireless network 102 as the bridge device in order to consume less power as well as to maintain a more reliable connection to the high-power wireless network 102.

Although each network device $110_G$ includes a high-power transceiver 130, in some embodiments, only one of the network devices 110 (i.e., the bridge device) is actively using its high-power transceiver 130 at a given time. For example, the high-power transceivers 130 of the other network devices 110 may be operated in a low-power mode or in some cases may be completely de-energized. Thus, the levels of interference and signal strengths on the high-power wireless network 102 for the other network devices 110 cannot be determined while these network devices 110 are operating their high-power transceivers 130 in the low-power or no-power mode. In one embodiment, when the current bridge device detects an amount of interference above a threshold or a signal strength below a threshold, then the bridge device can transmit a signal to one or more of the other network devices 110 to activate their high-power transceivers 130 in order to determine the levels of interference and signal strength on the high-power wireless network 102 for those other network devices 110. Then a comparison can be made between the levels of interference and signal strengths for current bridge device relative to one or more of the other network devices 110. A determination can be made by, for example, one of the other network devices 110 that this other network device 110 is better suited to communicate with the high-power wireless network 102 than the current bridge device when this other network device 110 observes less interference or higher signal strength for communicating on the high-power wireless network 102 than the current bridge device.

In some embodiments, the bridge device can be switched among available network devices $110_G$ in the group 105 based on one or more timers. For example, an expiration of a timer (e.g., a 24-hour timer) can be used to switch the bridge device among a subset of the network devices $110_G$, so that power can be consumed substantially evenly among this subset of networked devices $110_G$. The subset may, for example, include the network devices $110_G$ that are easily accessible, such as the network devices $110_G$ that are portable (e.g., a portable motion detector). The timer may include a device that is within, or used in combination with, the processor (e.g., CPU 112) to count-up or count-down until an allotted "use time window" value, which may be a constant stored in memory, has been reached. In one embodiment, one network device $110_G$ can use software to execute the timer used to switch which network device $110_G$ is the bridge device in a master-slave arrangement. Executing the timer on only one network device 110 can conserve power on the other network devices 110. Using a timer to determine which network device $110_G$ should be the bridge device can also be useful when the group 105 includes network devices $110_G$ that do not include sensors to monitor the state-of-charge of the batteries or when deciding not to monitor the state-of-charge of the batteries in a further attempt to conserve power. Furthermore, using a timer to determine which network device $110_G$ should be the bridge device can also be useful when the group 105 includes network devices $110_G$ that all are all a same type of network devices $110_G$ having the same power requirements, such as a group of sensors that are each expected to consume substantially similar amounts of power over extended time periods. For such embodiments that have a group of network devices $110_G$ that have the same expected power requirements, the extra hardware for monitoring the remaining power of the devices may be unnecessary.

State-of-charge and predicted runtime are examples of power-level indicators (also referred to as power-level values) that can be included in the status information. Power-level indicators and any other information about the power source(s) (e.g., on-board battery, remote power source) that are used to power a network device 110 are examples of power-related data, also referred to herein as power information. Information exchanged between network devices 110 other than power information can generally be referred to as device information. Device information can include, for example, status information about the network devices 110 or communication information from a network device 110 to be transmitted to a device on the high-power wireless network 102.

Next, during step 210, the first network device $110_1$ can analyze the different status information (e.g., state-of-charge, accessiblity of devices, proximities to wireless access point, etc.) available for the other network devices 110 against its own status information to determine if the first network device $110_1$ should be the bridge device. Numerous rules may be constructed to determine which network device 110 should be the bridge device based on the status information available. For example, a rule may be set to use certain types of available additional network devices $110_A$ (e.g., a television) as the bridge device regardless of the other status information, such as state-of-charge of the batteries of the network devices $110_G$ in the group 105. For example, another rule may be set to only use moderately accessible network devices 110 (e.g., proximity sensor mounted to a door) as the bridge device if the easily accessible network devices 110 (e.g., portable remote control) each have state-of-charge less than 25%. These rules can be adapted as needed for a given group 105 of network devices $110_G$.

At step 215, after determining the first network device $110_1$ should be the bridge device, the first network device $110_1$ connects to the high-power wireless network 102. For example, in some embodiments this step may be represented by the first network device $110_1$ connecting to the high-power wireless network 102 by forming a Wi-Fi connection to a wireless access point (e.g., wireless router) on the high-power wireless network 102. In some embodiments, this step is also represented by the first network device $110_1$ forming a communication link to one of the devices on the high-power wireless network 102, such as the cloud server 60. If the first network device $110_1$ is an additional network device $110_A$, such as a mobile phone, the additional network device $110_A$ may already be connected to the high-power wireless network 102 before determining the first network device $110_1$ should be the bridge device.

At step 220, the first network device $110_1$ connects to other network devices 110 on the low-power wireless network 101, such as a Bluetooth® connection. The first network device $110_1$ may have already been connected to one or more of the other network devices 110 on the low-power wireless network 101. In such cases, step 220 is when the first network device $110_1$ connects to the rest of the network devices 110 on the low-power wireless network 101. The order in which steps 215 and 220 are performed may be switched or performed substantially simultaneously.

At step 225, the first network device $110_1$ may optionally send an acknowledgment to the last bridge device informing the last bridge device that the first network device $110_1$ is the new bridge device and has established connections to the high-power wireless network 102. During step 225 the first network device $110_1$ may optionally also send status type information to the other network devices 110 on the low-power wireless network 101. At this point, the last bridge device may disconnect from the high-power wireless network 102, and optionally disconnect from at least some of the network devices 110 on the low-power wireless network 101. For example, the last bridge device can maintain its connection on the low-power wireless network 101 to the new bridge device, which is the first network device $110_1$. In some embodiments, the last bridge device can determine on its own that the last bridge device should no longer be the bridge device causing the last bridge device to disconnect from the high-power wireless network 102 and to disconnect from at least some of the network devices 110 on the low-power wireless network 101. In some cases, the last bridge device may decide that it should not be the bridge device due to some issue with the state of the last bridge device, such as the battery levels being too low, defects in the device, software issues or some other issue that may prevent it from adequately performing the task of being the bridge device. If the last bridge device decides that the last bridge device should not be the bridge device, then the last bridge device may send a signal to one or more of the network devices $110_G$ of the group 105 to notify these network devices $110_G$ that a new bridge device needs to be selected.

The first network device $110_1$ remains as the bridge device until another network device 110 is determined to be the bridge device at step 230. For example the first network device $110_1$ may receive an acknowledgment from the new bridge device informing the first network device $110_1$ that the new bridge device has completed connections to the high-power wireless network 102 and to the other network devices 110 on the low-power wireless network 101. In some embodiments, the first network device $110_1$ may be able to determine on its own when the first network device $110_1$ should not be the bridge device anymore. Furthermore, another device, such as a device on the high-power wireless network 102 may be able to determine which network device 110 should be the new bridge device and notify the first network device $110_1$ that the first network device $110_1$ is no longer the bridge device.

At step 235, after determining the first network device $110_1$ should not be the bridge device anymore, the first network device $110_1$ disconnects from the high-power wireless network 102. At step 240, the first network device 1101 disconnects from at least some of the network devices 110 on the low-power wireless network 101. For example, the first network device $110_1$ may disconnect all network devices 110 except the new bridge device. The order in which steps 235 and 240 are performed may be switched. After step 240, the first network device $110_1$ communicates on the networks 101, 102 through the bridge device and periodically evaluates status information to determine when the first network device $110_1$ should serve as the bridge device again.

FIG. 3 is a flow diagram of a method 300 for determining how the first network device $110_1$ should interact with the low-power wireless network 101 and the high-power wireless network 102 when the first network device $110_1$ is the bridge device. The method 300 illustrates how a balance can be set for reducing power consumption for the network devices $110_G$ in the group 105 while still allowing the bridge device to provide the communication path between the network devices $110_G$ in the group 105 and an external device, such as the cloud server 60, on the high-power wireless network 102.

At step 305, the first network device $110_1$ serving as the bridge device receives data from one or more devices on the low-power wireless network 101 and the high-power wireless network 102. When receiving data on the low-power wireless network 101, the first network device $110_1$ may, for example, receive updated measurements from a sensor of one of the network devices $110_G$ in the group 105. When receiving data on the high-power wireless network 102, the first network device $110_1$ may, for example, receive settings from a controller on the high-power wireless network 102 to configure one or more of the network devices 110, such as configuring a smoke detector (i.e., one of the network devices $110_G$) on a high ceiling as an inaccessible device to prevent or delay use of the smoke detector as the bridge device.

At step 310, the first network device $110_1$ transmits the received data from step 305 to the intended destination. For example, the first network device $110_1$ may transmit the updated measurements from the network device 110 including the sensor from step 305 to the cloud server 60 accessible on the high-power wireless network 102. The cloud server 60 may, for example, compare measurements to identify alarm conditions as well as store measurements received from the bridge device for trending historical data. As another example of the first network device $110_1$ transmitting data in step 310, the first network device $110_1$ may transmit the received settings from the controller to the smoke detector as described above in reference to step 305.

At step 315, when the first network device $110_1$ is not receiving data or transmitting data, the first network device $110_1$ can check to determine if a condition exists for disconnecting from the high-power wireless network 102. Maintaining the connection between the bridge device (i.e., the first network device $110_1$ here) and the high-power wireless network 102 can consume substantial amounts of power. Thus, at certain times it may be beneficial for the bridge device to disconnect from the high-power wireless network 102 while still remaining as the designated bridge device. However, disconnecting from the high-power wireless network 102 will adversely affect the communication speed of one or more of the network devices $110_G$ in the group 105 with an external device, since it will typically require multiple steps to connect and renegotiate the communication link between the bridge device and the high-power wireless network 102. In some cases, the slow communication speed is highly undesirable, and thus the technique of disconnecting from the high-power wireless network 102 is not done unless it is absolutely necessary. In some embodiments, a recurring timer may be used to check whether a condition for disconnecting the bridge device from the high-power wireless network 102 is present, such as once every hour.

Determining when a bridge device should disconnect from the high-power wireless network 102 to conserve power can include evaluating much of the same status information that is evaluated when a network device 110 is determined to be a new bridge device. For example, the power-related status information, such as state-of-charge and predicted runtime, and accessibility status information for the network devices $110_G$ in the group 105, can be relevant to determining when a bridge device should disconnect from the high-power wireless network 102 to conserve power. For example, a rule may be used to disconnect a network device $110_G$ of the group 105 serving as the bridge device from the high-power wireless network 102 when the predicted runtime of all of the network devices $110_G$ excluding the inaccessible network devices $110_G$ (e.g., the smoke detector on the ceiling) is below 100 hours. As another example, an additional network device $110_A$ may only be disconnected to conserve power when the additional network device $110_A$ is disconnected from external power, the predicted runtime of the additional network device $110_A$ is below two hours and the predicted runtime of all of the network devices $110_G$ excluding the inaccessible network devices $110_G$ (e.g., the smoke detector on the ceiling) is below 100 hours. In some embodiments, a device other than the bridge device can perform the processing to determine when conditions exist for disconnecting the bridge device from the high-power wireless network 102. For example, the cloud server 60 connected to the bridge device may evaluate the available status information to determine when the bridge device should disconnect from the high-power wireless network 102 to conserve power.

If at step 315, the first network device $110_1$ determines a condition does not exist for disconnecting from the high-power wireless network 102 to conserve power, the first network device $110_1$ resumes or continues to receive and transmit data at steps 305 and 310. If at step 315, the first network device $110_1$ determines a condition does exist for disconnecting from the high-power wireless network 102 to conserve power, then the first network device $110_1$ disconnects from the high-power wireless network 102 at step 320. At step 325, after disconnecting from the high-power wireless network 102, the first network device $110_1$ checks for conditions to reconnect to the high-power wireless network 102. Such conditions may include receiving data from a network device 110 on the low-power wireless network 101 to be transmitted to the high-power wireless network 102. Such conditions may also using the expiration of a timer, such as a one hour timer, to periodically reconnect to the high-power wireless network 102 to determine if there is any data to be transmitted to one of the network devices 110 from the high-power wireless network 102. The first network device $110_1$ remains in step 325 until the first network device $110_1$ determines a condition exists for reconnecting to the high-power wireless network 102 occurs.

At step 330, upon determining a condition exists for reconnecting to the high-power wireless network 102, the first network device $110_1$ reconnects to the high-power wireless network 102. After reconnecting to the high-power wireless network 102, the first network device $110_1$ can receive and transmit data in steps 305 and 310 as described above. The first network device $110_1$ can also check if conditions exist for disconnecting from the high-power wireless network 102 again in step 315 after receiving and transmitting data in steps 305, 310. The first network device $110_1$ can continue this loop of disconnecting from and reconnecting to the high-power wireless network 102 indefinitely.

Although having the bridge device disconnected from the high-power wireless network 102 creates higher latency for communication between the networks 101, 102, a proper balance between power consumption and latency can be set by adjusting settings related to when the bridge device disconnects and reconnects to the high-power wireless network 102. For example, power-related settings (e.g., state-of-charge) for when the bridge device disconnects from the high-power wireless network 102 can be adjusted. As another example, the time period in which the bridge device remains disconnected before reconnecting to the high-power wireless network 102 to check if any data is to be transmitted from the high-power wireless network 102 to one of the network devices 110 on the low-power wireless network 101 can also be adjusted.

In another embodiment, when the first network device $110_1$ determines a condition does exist for disconnecting from the high-power wireless network 102 to conserve power, then the bridge device or another network device $110_G$ in the group 105 may check if there is another group of network devices that (1) collectively has more power than the group 105 and (2) is capable of communicating to the low-power wireless network 101 and the high-power wireless network 102. If there is such a group of nearby network devices within a communication range of the group 105, then the group 105 may be able to reroute the communication between the low-power wireless network 101 and the high-power wireless network 102 through one or more of the network devices in this other group. Rerouting the communication through this other group allows the communication between the low-power wireless network 101 and the high-power wireless network 102 to continue without consuming the power which occurs when one of the network devices $110_G$ in the group 105 is active on the high-power wireless network 102. Thus, in this embodiment power consumption is preserved and low latency is also maintained when the other group is available to reroute and/or relay the communication between the group 105 and the high-power wireless network 102.

In another embodiment, when the first network device $110_1$ determines a condition does exist for disconnecting from the high-power wireless network 102 to conserve power, a new network device (e.g., a robot) may be automatically deployed to serve as the bridge device allowing the group 105 of network device $110_G$ to remain connected with the high-power wireless network 102. For example, in one embodiment a message could be sent to a local external device on the high-power wireless network 102, such as the local computing device 50 shown in FIG. 1A. The local computing device 50 may then send a command for a robot (e.g., a drone) to deploy to the area including the group 105 of network devices $110_G$, so that the robot can serve as the bridge device until a network device $110_G$ or an available additional network device $110_A$ can serve as the bridge device for the group 105. When the robot is no longer needed as the bridge device, then the robot can automatically return to a location to be recharged, such as a docking station.

While the foregoing is directed to embodiments of the present disclosure, other and further embodiments of the disclosure may be devised without departing from the basic scope thereof, and the scope thereof is determined by the claims that follow.

What is claimed is:

1. A method of transferring information between electronic devices, comprising:
   receiving, at a first network device, device information and power information from a second network device, wherein the received device information and power information is transferred over a first communication link on a first network, wherein the first communication link is formed between a first transceiver of the first network device and a first transceiver of the second network device;
   comparing the received power information with power information of the first network device, wherein the power information of the first network device includes information about a first power source used to power the first network device and the received power information includes information about a second power source used to power the second network device; and
   transferring at least a portion of the received device information from the first network device over a second communication link on a second network when it is determined based on the comparison that the first network device is better suited to communicate on the second network than the second network device, wherein
      the second communication link is formed between a second transceiver of the first network device and a device transceiver of an external electronic device,
      the first power source is an on-board power source of the first network device and the power information of the first network device comprises a first state-of-charge of the first power source;
      the second power source is an on-board power source of the second network device and the power information of the second network device comprises a second state-of-charge of the second power source; and
      the first network device is determined to be better suited to communicate on the second network when the first state-of-charge is greater than the second state-of-charge; and
   upon determining the first state-of-charge is less than the second state-of-charge, transferring additional device information from the second network device over a third communication link formed between a second transceiver of the second network device and the device transceiver of the external electronic device,
   wherein transferring the additional device information over the third communication link is performed after terminating the second communication link.

2. The method of claim 1, wherein the first network device consumes more power when transferring information on the second communication link than by transferring the same information on the first communication link.

3. The method of claim 1, further comprising:
   disconnecting the first network device from the second network when a power-level indicator of the first power source drops below a threshold; and
   upon determining, by the first network device, a request to send data to the second network, restoring the connection between first network device and the second network.

4. The method of claim 1, wherein
   the first power source is an on-board power source of the first network device and the power information of the first network device comprises a first predicted runtime for the first network device using the first power source;
   the second power source is an on-board power source of the second network device and the power information of the second network device comprises a second predicted runtime for the second network device using the second power source; and
   determining the first network device is better suited to communicate on the second network further includes determining the first predicted runtime is greater than the second predicted runtime.

5. The method of claim 1, wherein
   the power information of the first network device comprises a first attribute indicating a type of power source attributed to the first power source;
   the power information from the second network device comprises a second attribute indicating a type of power source attributed to the second power source; and
   determining the first network device is better suited to communicate on the second network further includes determining the first attribute indicates the first power source is a remote power source and the second attribute indicates the second power source is an on-board power source.

6. The method of claim 1, wherein the comparison of the power information received from the second network device with the power information received from the first power source is performed before the device information is received.

7. A method for communicating between a plurality of network devices on a low-power wireless network and an external electronic device on a high-power wireless network, the method comprising:
   receiving, by a first network device of a plurality of network devices, information from one of the other plurality of network devices using a first communication link formed using the low-power wireless network;
   transferring at least a portion of the received information from the first network device to the high-power wireless network using a second communication link, wherein the first and second communication links are maintained simultaneously by the first network device;

receiving, by the first network device, one or more power-level indicators from one or more of the plurality of network devices; and upon determining a power-level value is below a minimum value stored in memory of the first network device, disconnecting the first network device from the high-power wireless network, wherein the power-level value is based on one or more of the power-level indicators from the one or more of the plurality of network devices and further based on a power-level indicator of the first network device.

8. The method of claim 7, further comprising:

upon determining a second network device of the plurality of network devices is better suited to communicate with the high-power wireless network than the first network device, forming a third communication link between the second network device and the high-power wireless network and terminating the second communication link, wherein forming the third communication link further comprises:

receiving, by the second network device, data from the first network device over the low-power wireless network; and transmitting, by the second network device, the data received from the first network device.

9. The method of claim 7, further comprising:

upon determining, by the first network device, a request to send data to the high-power wireless network, restoring the connection between the first network device and the high-power wireless network.

10. A method for communicating between a plurality of network devices on a low-power wireless network and an external electronic device on a high-power wireless network, the method comprising:

receiving, by a first network device of a plurality of network devices, information from one of the other plurality of network devices using a first communication link formed using the low-power wireless network;

transferring at least a portion of the received information from the first network device to the high-power wireless network using a second communication link, wherein the first and second communication links are maintained simultaneously by the first network device;

upon determining a second network device of the plurality of network devices is better suited to communicate with the high-power wireless network than the first network device, forming a third communication link between the second network device and the high-power wireless network and terminating the second communication link; and transferring additional device information from the second network device over a third communication link formed between a second transceiver of the second network device and a device transceiver of the external electronic device, wherein the first network device comprises a first power source having a first state-of-charge, the second network device comprises a second power source having a second state-of-charge, and the upon determining the second network device is better suited to communicate with the high-power wireless network than the first network device comprises determining the second state-of-charge is greater than the first-state-of-charge.

11. The method of claim 10, wherein determining the second network device is better suited to communicate with the high-power wireless network than the first network device comprises determining the first network device includes an on-board power source and the second network device includes a power input to receive power from a remote power source.

12. The method of claim 10, wherein forming the third communication link further comprises:

receiving, by the second network device, data from the first network device over the low-power wireless network; and transmitting, by the second network device, the data received from the first network device.

13. A method for communicating between a plurality of network devices on a low-power wireless network and an external electronic device on a high-power wireless network, the method comprising:

receiving, by a first network device of a plurality of network devices, a first set of information from one of the other plurality of network devices using a first communication link formed using the low-power wireless network;

transferring at least a portion of the first set of received information from the first network device to the high-power wireless network using a second communication link, wherein the first and second communication links are maintained simultaneously by the first network device, and the second communication link is a low latency type communication link;

maintaining the second communication link continuously for a delay period;

receiving, by the first network device of a plurality of network devices, a second set of information from one of the other plurality of network devices using the first communication link;

transferring at least a portion of the second set of received information from the first network device to the high-power wireless network using the second communication link; and upon determining a second network device of the plurality of network devices is better suited to communicate with the high-power wireless network than the first network device, forming a third communication link between the second network device and the high-power wireless network and terminating the second communication link, wherein determining the second network device is better suited to communicate with the high-power wireless network than the first network device comprises determining that an amount of time equal to a use time window has expired for the first network device.

14. The method of claim 13, wherein determining the second network device is better suited to communicate with the high-power wireless network than the first network device further comprises determining that the second network device observes less interference for communicating on the high-power wireless network than the first network device.

15. The method of claim 13, wherein the first network device comprises a first power source having a first state-of-charge, the second network device comprises a second power source having a second state-of-charge, and the upon determining the second network device is better suited to communicate with the high-power wireless network than the first network device further comprises determining the second state-of-charge is greater than the first-state-of-charge.

16. The method of claim 13, wherein the first network device consumes more power when transferring information on the second communication link than by transferring the same information on the first communication link.

* * * * *